June 2, 1959  J. A. HILLS  2,888,750
PERIMETER MEASURING DEVICE
Filed March 30, 1955
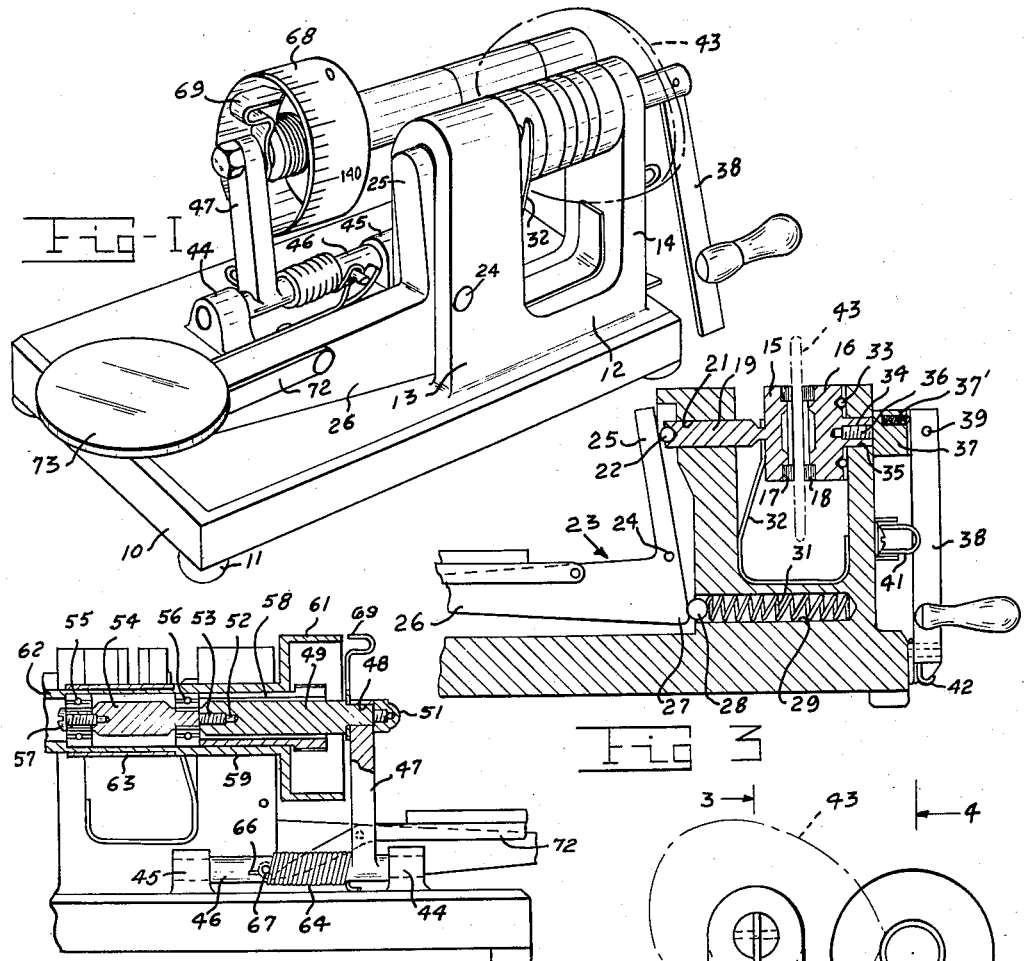
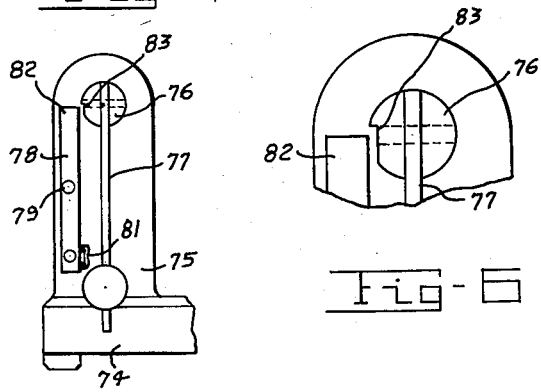
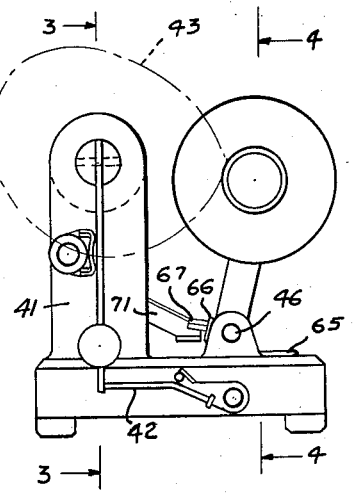
INVENTOR.
JOSEPH A. HILLS
BY Tom Walker

United States Patent Office 2,888,750
Patented June 2, 1959

2,888,750

PERIMETER MEASURING DEVICE

Joseph A. Hills, Dayton, Ohio

Application March 30, 1955, Serial No. 497,963

11 Claims. (Cl. 33—141)

This invention relates to tools for measuring the circumference of parts either circular or of irregular configuration, and while not so limited has particular utility in the art of preparing lenses for fitting to eye glass frames.

Opticians have need to determine the circumferential dimension of lenses. Apparatus is known which is useful in the taking of this measurement but it has heretofore been in a form impractical for use in the shops of many opticians and optometrists because of its size, cost and complexity of operation. A demand in the art long has existed for a simple, yet accurate tool of more general and real utility. The instant invention has as its object the meeting of that demand.

The object of the invention is to simplify the construction as well as the means and mode of operation of measuring instruments, whereby such instruments may not only be economically manufactured, but will be more efficient and satisfactory in use, adaptable to a wide variety of applications, and be unlikely to get out of order.

Another object of the invention is to present a tool of the kind described which is small, easily operated and relatively inexpensive of construction.

A further object of the invention is to provide in a small and compact tool for opticians a means for quickly and accurately measuring the circumference of a part.

A further object of the invention is to provide a tool displaying automatically a reading of such measurement.

A further object of the invention is to provide a measuring instrument possessing the advantageous structural features, the inherent meritorious characteristics and the mode of operation herein mentioned.

With the above primary and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, Fig. 1 is a view in perspective of a tool constructed in accordance with the illustrative embodiment of the invention;

Fig. 2 is a view of the tool of Fig. 1, in end elevation;

Fig. 3 is a view in longitudinal section, taken substantially along the line 3—3 of Fig. 2;

Fig. 4 is a view in longitudinal section, taken substantially along the line 4—4 of Fig. 2; and Fig. 5 is a view similar to Fig. 2, showing modified form of arresting means for the rotary crank mechanism of the tool.

Like parts are indicated by similar characters of reference throughout the several views.

Referring to the drawings, a tool in accordance with the illustrated embodiment of the invention comprises a base plate 10 which may on its bottom surface be provided with feet 11. On the upper surface of the plate 10 is a yoke or U-shaped bracket 12 presenting longitudinally spaced apart mounting arms 13 and 14. Disposed between the arms 13 and 14 are axially aligned chuck jaws in the form of discs 15 and 16. The adjacent faces of the discs 15 and 16 are recessed to mount respective pads 17 and 18 of a relatively soft material. The opposite face of the disc 15 has an axial stem 19 slidably mounted in a through bore 21 in the arm 13. The projecting end of the stem 19 is recessed to mount a ball bearing 22 through which an axial pressure is exerted upon the stem 19 and disc 15 through a lever 23. As shown, the lever 23 has the shape of a bell crank, being pivotally mounted at 24 in the upstanding arm 13. One arm 25 of the lever bears on the ball 22, while the other arm 26 extends longitudinally away from the yoke 12 in generally parallel relation to the base 10. A shoulder 27 beneath the pivot point 24 engages a ball 28 housed in a bore 29 in the yoke 12 and backed by a compression spring 31 therein. Under the urging of spring 31, the lever 23 tends to rock in a clockwise direction as viewed in Fig. 3 to urge the disc 15 in a right hand or approaching direction relatively to the disc 16. Depression of the arm 26, as may be accomplished by the hand of the operator, rocks the lever 23 in a counterclockwise direction to compress spring 31 and release the disc 15 for retracting motion relatively to the disc 16. Such motion is effected through a leaf spring 32 housed in the yoke 12 between the arms 13 and 14, the lower end of spring 32 being U-shaped and seated in the base of the yoke 12 and in engagement with the arms 13 and 14 at the outer sides thereof, and having an upper forked end engaging a reduced diameter portion of the stem 19 of the disc 15.

The rear surface of the disc 16 is formed as a thrust bearing, having ball bearings 33 recessed therein and confined between the disc and the adjacent wall of arm 14. Also on such other or rear face of the disc 16 is an axial cylindrical projecting portion 34 received in a through bore 35 in the arm 14. The interior of cylindrical projection 34 is screw threaded and receives a similarly threaded reduced diameter extension 36 on one end of a hub member 37. The other end of the hub member 37 is transversely slotted and receives one end of a crank arm 38. A cross pin 39 extends through the crank arm 38 and through the bifurcated end of the hub member 37, the crank arm 38 being thus free for limited rocking motion in a counterclockwise direction relatively to the hub member 37 ( as seen in Fig. 3) but being connected to the hub member for unison rotation therewith. Also controlling the movements of the crank arm 38 are spring fingers 41 and 42, the former being mounted on the side of the upstanding arm 14 in position to arrest swinging motion of the crank arm in a clockwise direction as viewed in Fig. 2. The spring finger 42 is mounted on the end of the base 10 in position substantially to underlie the other or outer end of the crank arm 38. Thus, as the crank arm approaches the spring finger 41, it deflects the spring finger 42 out of its path. Then, as the crank arm becomes fully arrested by the finger 41 it passes over the outer end of the finger 42 which then is free to rise in back of the arm, the crank arm being thus locked against motion in either a forward or reverse direction until released from the finger 41 by an outward swinging motion about the pivot pin 39 whereupon it may again be turned through 360° of motion as limited and defined by the cooperating spring fingers 41 and 42.

The discs 15 and 16 are thus arranged for relative rotary and axial motions. Under the influence of spring 31, the discs normally are pressed together with the pads 17 and 18 in contact with one another or substantially so. By depressing the arm 26 of the lever 23, as before mentioned, the operator may separate the discs and insert therebetween a lens 43, the lens being approximately centered relatively to the discs and the discs being of such diameter as to permit the peripheral edge portion of the lens to project beyond the peripheries of the discs. Release of the arm 26 restores the lever 23 to the influence of spring 31 and the disc 15 accordingly returns toward the disc 16 with the two discs cooperating to apply a holding pressure to the interposed lens 43. The spring forces and areas of surface contact involved are sufficiently large as to cause the lens 43 to be gripped with some security between the discs 15 and 16. Thus, rotation of the crank arm 38 which is effective to positively rotate the disc 16 also is effective simultaneously to rotate the lens 43, the whole of the assembly comprising the crank arm, the hub member 37, discs 15 and 16 and the held part 43 rotating as a unit.

Mounted alongside the yoke 12, in longitudinally extending relation to the base 10, and rotatably mounted in upstanding bosses 44 and 45, is a shaft 46. Formed integrally with or otherwise secured to the shaft 46 is an upstanding arm 47 having an opening 48 in the upper or outer end thereof. Installed in the opening 48 is one end of a bearing shaft 49, such shaft having a reduced diameter extension projecting through and beyond the opening 48 on which is threaded a nut 51. At the opposite end of the shaft 49 is a tapped recess 52 receiving a reduced diameter threaded end of a bearing extension 54. The member 54 supports spaced apart ball bearing assemblies 55 and 56, the former being installed between a shoulder on the extension member 54 and a screw 57 and the latter being installed between a shoulder on extension member 54 and one end of a radially expansible split bushing 58. A sleeve 59 is rotatably mounted on the bearings 55 and 56 and at one end thereof is formed with an enlarged flange portion 61. The bushing 58 is received in the sleeve 59 through the open flanged end 61 with a press fit and when installed prevents sliding motion of the sleeve 59 relatively to the bearing shaft 49 in a lefthand direction. Sliding motion of the sleeve in the opposite direction is prevented by an abutment ring 62 inserted in the opposite end of the sleeve 59 and engageable with the ball bearing assembly 55.

The sleeve 59 thus is supported in parallel relation to the shaft 46, as well as in parallel nearby relation to the longitudinal axes of the discs 15 and 16. In line with or opposite the discs 15 and 16 the sleeve 59 mounts a collar 63 of a relatively hard material and presenting a smooth surface to the edge of the part 43 held between the discs 15 and 16. By reason of the rotary mounting of the shaft 46, the assembly comprising the arm 47, bearing shafts 49 and 54 and the sleeve 59 may be rocked nearer to or more distant from the longitudinal axes of the discs 15 and 16. A torsion spring 64 surrounds the shaft 46 and has one end 65 bearing on the base plate 10 and another end 66 bearing on a cross pin 67 extending out of the shaft 46 in a manner to urge the shaft 46 in a counter-clockwise direction as viewed in Fig. 2. This is a direction tending to move the sleeve 59 toward the discs 15 and 16 with the result that the collar 63 on the sleeve yieldingly is held in engagement with the edge of the held part 43 and is enabled to follow the changing configuration of such part. It will be understood that the frictional engagement afforded by contact of the hardened collar 63 with the peripheral edge of the part 43 is sufficient to rotate the sleeve 59 in accompaniment with rotation of the part 43.

On the exterior of the flanged end 61 of the sleeve 59 is a series of graduations 68 defining a progressive scale for exhibiting in terms of millimeters or the like the measured circumference of a part 43. A pointer 69 is stationarily mounted on the bearing shaft 49 between the shaft and arm 47 and serves as a reference point for setting and for reading the graduations 68.

The sleeve 59 may thus be termed an indicator or dial sleeve. It is retracted from engagement with the part 43, for installation and removal purposes, by a lever arm 71, the latter extending from a bracket means 72 pivotally mounted on the arm 26 of lever 23 and including a plate 73 for more facile application of hand pressure to the lever 71 and to the arm 26 which is overlaid by the plate 73. The lever 71 underlies the cross pin 67 in the shaft 46. Pressing the plate 73 downward serves to raise the lever 71 and thereby to rock the shaft 46 in a clockwise direction as seen in Fig. 2 to disengage the sleeve 59 from the edge of part 43. The plate 73 normally is situated slightly above the arm 26 and it will be recognized that the construction and arrangement of parts provided is that of a compound lever wherein downward pressure on the plate 73 is effective first to rock the shaft 46 for disengagement of the sleeve 59 and then to rock the lever 23 to release the axial holding pressure exerted by the discs 15 and 16 upon the part 43. It should be noted that the cross pin 67 is approximately the same vertical plane as pivot 24. Thus lever 71, after completion of its independent motion about its pivot on arm 26, completes its motion about pivot 24. The lever 71 therefore rises or falls very little during motion of the lever arm 23 about its pivot 24, and the position of shaft 46 and its associated indicating sleeve 59 remains substantially constant during operation of lever 23.

In mounting a part 43 for reading of its circumferential dimension, the plate 73 is fully depressed, adjusting the sleeve 59 and the disc 15 to what may be termed their retracted or open positions. A part 43 then is inserted between the discs 15 and 16 and the plate 73 is released. As a result, lever 23 moves to apply an axial holding pressure to the part and the lever 71 drops downward to restore the shaft 46 and associated parts to control of the spring 64 which frictionally engages the sleeve 59 with the projecting peripheral edge of the part 43. Now, the crank arm 38 is turned through its permitted movement of 360° and a similar extent of motion so is imparted to the held part 43. In turn, the sleeve 59 is rotated by the part 43 and will pass through a predetermined number of complete revolutions and fractions thereof dependent upon the ratio as established in part by the diameter of the sleeve. In the illustrated instance, the sleeve is adapted to complete two full revolutions each of which may be considered to represent a distance of fifty millimeters and then passes through a fraction of a third revolution having an extent varying with the circumference of the part. Thus, the line marked zero in the series of graduations 68 may for reading purposes be considered as the one hundred millimeter mark. The sleeve is pre-adjusted to align this mark with the stationary indicator 69 and the distance beyond this mark traveled by the sleeve after its first two revolutions is a measure of the circumference of the part under measurement. The series of graduations may be correspondingly marked, byond zero, as from 101 to 149.

An alternate form of means for arresting and locating the crank arm is shown in Fig. 5. Thus, according to this construction and arrangement of parts, a base 74 mounts a yoke 75 corresponding to the yoke 12 and having a hub 76 and crank arm 77 thereon operating in substantially the same manner and for the same purpose as the corresponding parts 37 and 38 above disclosed. In this instance, however, a lever 78 is pivotally mounted on one side of the yoke 75 and intermediate its vertical extremites, as at a point 79. Beneath the pivot point 79, the lever 78 carries a spring finger 81 similar in construction to the spring finger 41 and serving a like purpose in yieldingly arresting rotary turning motion of the crank arm 77. Above the pivot point 79, the lever 78 terminates in the form of a pawl 82 engageable in a peripheral notch 83 in the hub 76. The notch 83 is located to arrive in cooperative relation with the pawl 82 at the same time that spring finger 81 arrests arm 77 and under pressure applied through the spring 81 the pawl engages in the notch 83 preventing retrograde movement of the crank arm.

From the above description it will be apparent that there is thus provided a device of the character described possessing the particular features of advantage before enumerated as desirable, but which obviously is susceptible of modification in its form, proportions, detail construction and arrangement of parts without departing from the pinciple involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. A device for measuring the circumference of eyeglass lenses and the like, including a support, a shaft mounted on said support for to and fro motion about its longitudinal axis, an upstanding arm on said shaft, a graduated dial carried by said arm for relative rotary motion, said dial being disposed with its longitudinal axis parallel to said shaft, an axially projecting sleeve on said dial, means for rotatably carrying a lens in side by side adjacent relation to said sleeve, and means operatively connected with said carrying means and said shaft and conjointly operable to substantially simultaneously rotate said shaft to retract said sleeve from the lens and release said lens from said carrying means.

2. A device according to claim 1, characterized by means for rotating said carrying means and means normally biasing said sleeve toward said carrying means, the lens or the like carried by said carrying means thereby frictionally engaging and correspondingly rotating said sleeve.

3. A device for measuring the circumference of eyeglass lenses and the like, including a base support, a substantially U-shaped mounting member on said base support, oppositely disposed jaw members mounted in the upstanding arms of said member for relative approaching and separating motions, said jaw members being adapted to receive therebetween and hold a lens or the like with the peripheral edge portion of the lens defining a circumferential projection around said jaws, means for rotating said jaws, and an indicator dial assembly mounted on said support frictionally to be engaged and rotated by the projecting edge of the lens held by said jaws, means pivotally mounted on said mounting member and operatively related to one of said jaw members for effecting a separation of said one jaw member from the other therethrough and means connected to said pivotally mounted means operative substantially simultaneously therewith on the effecting of the separation of said one jaw member from the other to withdraw said dial assembly from its lens engaging position.

4. A device according to claim 3, characterized in that said dial assembly has means mounting it on said support for bodily rocking motion whereby to follow non-circular contours of the circumference measured.

5. A device for measuring the circumference of eyeglass lenses and the like, including a base support, a pair of upstanding mounting arms on said base support, oppositely disposed pressure discs between said arms adapted to receive therebetween and to hold a lens or like part with the peripheral edge of the part projecting beyond the peripheries of the discs, said discs being mounted for rotary and relative axial motion in said arms, a rotatable dial sleeve mounted on said support and bodily adjustable into and out of frictional contact with the peripheral edge of said part for rotation therewith, a crank arm assembly on one of said discs for rotation thereof, limit means for interrupting turning motion of said crank arm assembly after a predetermined extent of movement thereof, means for locking said crank arm assembly against retrograde motion when engaged with said limit means and lever means operatively connected with said pressure discs and said sleeve and selectively actuable to dispose said sleeve out of frictional contact with the lens or part between said pressure discs and to provide release of said pressure discs.

6. A device according to claim 5, said locking means being characterized by a spring finger mounted on said base support to be deflected by the crank arm of said assembly as it approaches said limit means and to return substantially to contacting relation with the trailing edge of said arm as the leading edge thereof engages said limit means.

7. A device in accordance with claim 5, wherein said limit means and said locking means are provided by a lever means pivotally mounted on one of said arms and having means on the respective ends thereof to respectively limit the turning of said crank arm assembly and prevent retrograde motion thereof.

8. A device for measuring the circumference of eye glass lenses and the like comprising, support means, opposed friction plate means rotatably mounted on said support means, one of said friction plate means being axially adjustable relative the other to frictionally clamp a lens or the like therebetween, a dial assembly mounted on said support means and biased to peripherally engage the circumference of a lens clamped between said plate means, and lever means mounted on said support means and operatively connected to said friction plate means and to said dial assembly and operable to successively disengage said dial assembly from the lens and release said one of the friction plate means for release of the lens thereby.

9. A device for measuring the circumference of eye glass lenses and the like comprising support means, opposed friction plate means rotatably mounted on said support means, one of said friction plate means being axially adjustable relative to the other to frictionally clamp a lens or the like therebetween, a dial assembly mounted on said support means and biased to peripherally engage the circumference of a lens mounted between said plate means, a first lever pivotally mounted on said support means and operatively connected to said friction plate means, and a second lever pivotally mounted on said first lever and operatively connected to said dial assembly, the initiation of operation of said second lever displacing said dial assembly from the lens and the continued operation thereof actuating said first lever to provide for release of the lens from said plate means.

10. A device for measuring the circumference of eyeglass lenses and the like, including a support, a pair of friction plates adapted to receive therebetween a lens with its circumferential edge projecting beyond the periphery of said plates, said plates being rotatably supported on said support, means connected to said support to bias one of said plates from the other, further means mounted on said support normally operatively connecting to said one of said plates to bias it to the other of said plates to effect a clamping of a lens therebetween against the influence of said first mentioned biasing means, means for rotating said plates, a sleeve rotatably mounted in said support in parallel relation to the axes of said plates, means normally biasing said sleeve toward said plates, said sleeve being normally engageable with the periphery of the lens and rotated thereby in response to the rotation of said plates, and cooperative indicator means on said sleeve and on said support, means connected for displacement of said further biasing means whereby said first mentioned biasing means will bias said one of said plates from the other, and said sleeve having means connected to said displacement means for displacement of said sleeve from normal engagement with the periphery of the lens simultaneously operated by said first displacement means.

11. A device for measuring the circumference of eyeglass lenses and the like, including a base support, a pair of upstanding mounting arms on said support, oppositely disposed gripping jaws between said arms and respectively rotatably mounted therein, at least one of said jaws being longitudinally movable to effect opening and closing movements of the jaws to release or hold a lens or the like selectively interposed therebetween, said jaws being of a size to permit the peripheral edge portion of the interposed lens to project circumferentially therefrom, biasing means urging said jaws closed, spring means disposed between said arms and engaged to said one of said gripping jaws urging it from the other of said gripping jaws, means for rotating said jaws, a dial assembly mounted on said support for rotation by frictional engagement with the peripheral edge of the lens, said dial assembly being mounted for bodily rocking motion toward and away from said jaws, means normally biasing said assembly toward said jaws, and means operably connected to said first mentioned biasing means for displacing said biasing means permitting opening of said jaws by said spring means and substantially simultaneously therewith displacing said dial assembly from said jaws.

References Cited in the file of this patent

UNITED STATES PATENTS

| | | |
|---|---|---|
| 526,849 | Adler | Oct. 2, 1894 |
| 1,389,912 | Stead | Sept. 6, 1921 |
| 1,759,992 | McCarthy | May 27, 1930 |
| 2,677,891 | Hansen | May 11, 1954 |